Feb. 10. 1925.  
E. GANNON ET AL  
1,525,729  
WEED CUTTER AND TRACK DRESSER  
Filed April 28, 1924   3 Sheets-Sheet 1
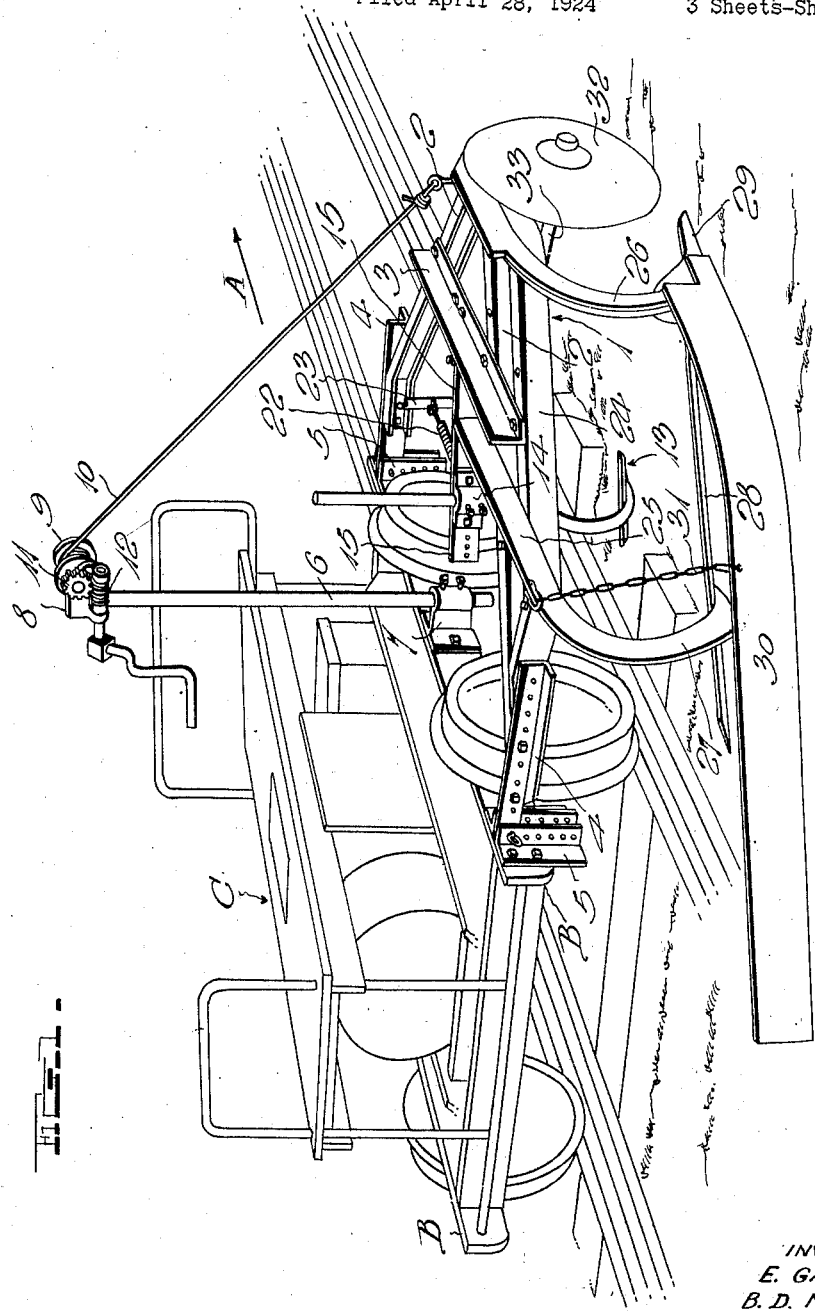
INVENTORS  
E. GANNON  
B. D. McGINN  
A. H. SPRUTE  
G. F. AKIN  
T. J. FEELY  
BY J. H. Jewin.  
ATTORNEY

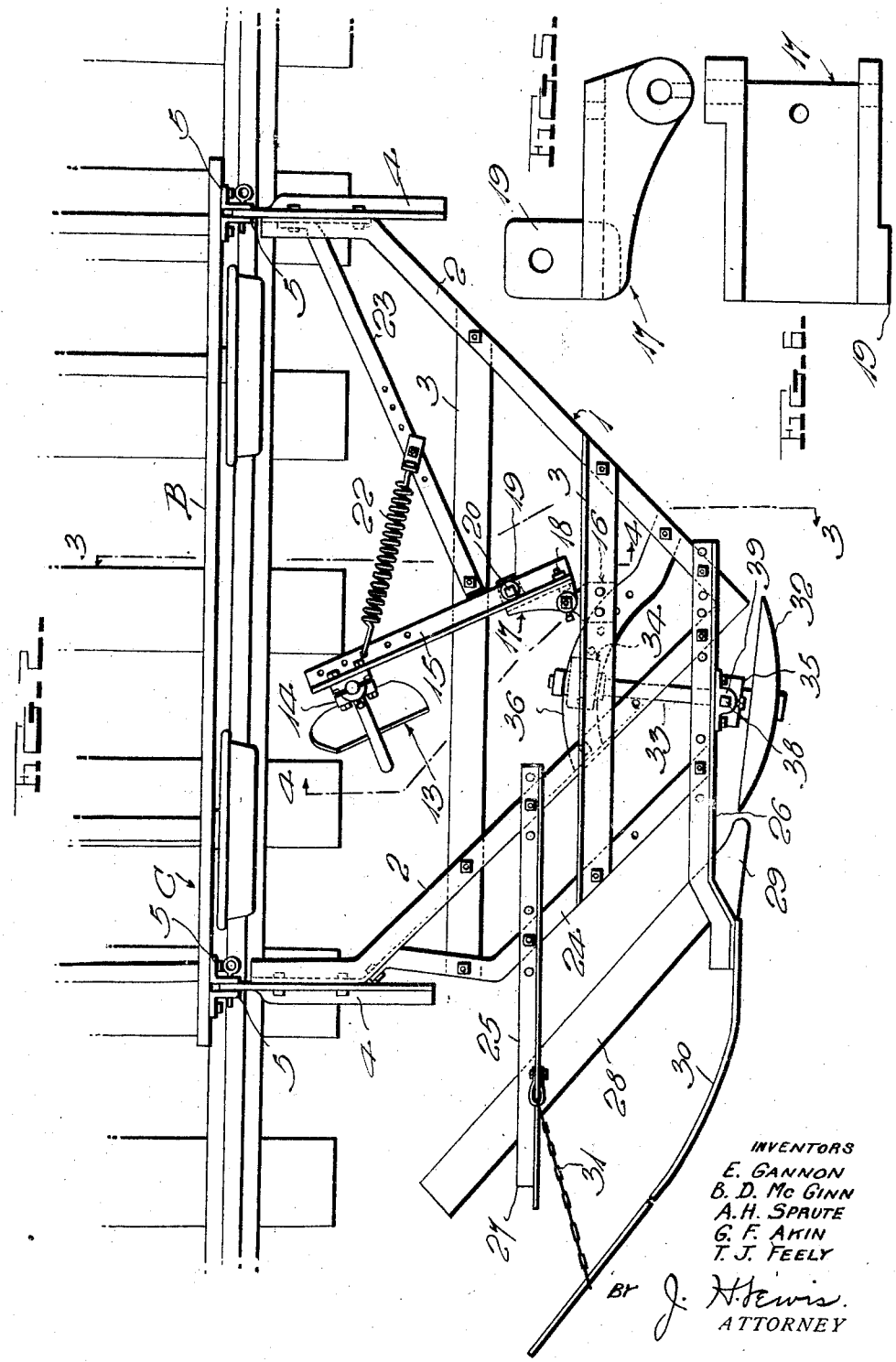

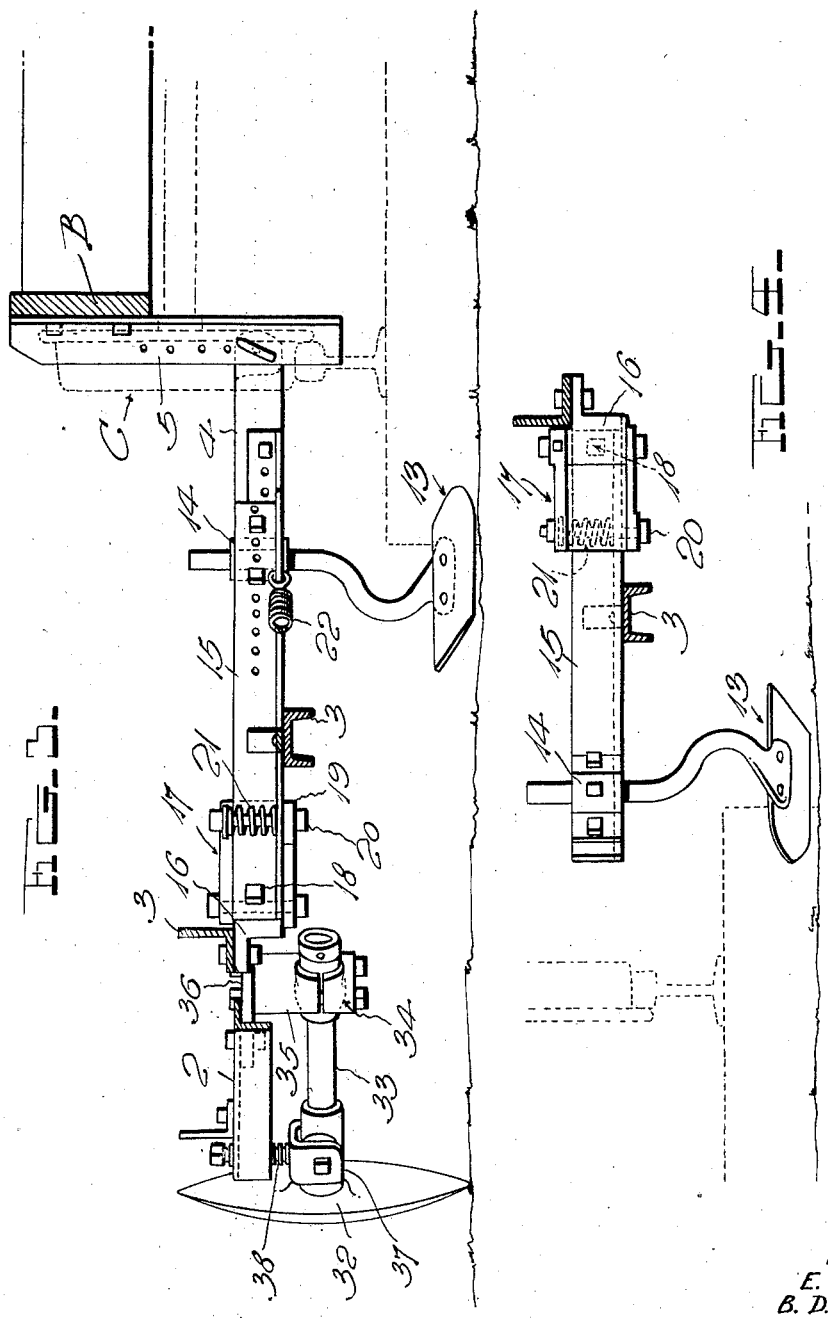

Patented Feb. 10, 1925.

1,525,729

UNITED STATES PATENT OFFICE.

ELIZABETH GANNON, BERNARD D. McGINN, AUGUST H. SPRUTE, GERRIT F. AKIN, AND THOMAS J. FEELY, OF FARMINGTON, MINNESOTA, ASSIGNORS TO GANNON WEED CUTTER AND TRACK DRESSER COMPANY, OF FARMINGTON, MINNESOTA, A CORPORATION OF MINNESOTA.

WEED CUTTER AND TRACK DRESSER.

Application filed April 28, 1924. Serial No. 709,535.

*To all whom it may concern:*

Be it known that we, ELIZABETH GANNON, BERNARD D. McGINN, AUGUST H. SPRUTE, GERRIT F. AKIN, and THOMAS J. FEELY, citizens of the United States, residing at Farmington, in the county of Dakota and State of Minnesota, have invented certain new and useful Improvements in Weed Cutters and Track Dressers, of which the following is a specification, reference being had therein to the accompanying drawing.

This invention relates to an improved machine which may be conveniently referred to as a weed cutter and track dresser.

In a prior patent bearing Number 1,152,940 granted to P. J. Gannon on September 7, 1915, a machine of the above named type is shown, and by referring to that patent it will be observed that, among other details, it embodies an angled weeding hoe carried by a frame, said hoe being pivotally supported and capable of swinging transversely of the frame so that it is active for destroying weeds entirely up to the ends of the ties, regardless of the variance in length of the latter. While this detail is indeed a very important feature of the patent, it has now been discovered that more effective results can be attained by so constructing it that it can reciprocate while in operation to insure constant engagement of the hoe with the ground regardless of the irregular contour of the surface of the latter.

It is therefore one of the prime features of the present invention to embody the aforesaid weeding hoe in the machine, but to mount it on the frame in a manner to permit the hoe to automatically move vertically to conform to the contour of the earth's surface and at the same time cause it to be held in yieldable engagement with said surface to overcome breakage.

More specifically speaking, we utilize a weeding hoe in the improved structure which, through the medium of a double fulcrum and other co-acting details, is permitted to swing on both horizontal and vertical pivots.

Furthermore, we utilize adjustable spring means in association with the hoe mounting means and so arrange it that a direct spring tension will be exerted on the hoe in the direction of travel instead of the indirect pull accomplished in the patent.

Another distinction in construction over the patented device and a feature favoring the present arrangement, is the provision of an adjustable colter, that is, one which is adjustable vertically for elevation and swingable horizontally about a vertical axis to change the angularity of the disk whenever desired.

A further aim is to provide a mounting frame which is not only pivotally mounted for vertical movement, but is bodily adjustable to permit the elevation to be varied as desired.

The new device is also advantageous over the old in that it includes a novel hoisting device for raising and lowering the frame or for positively holding it in a set position.

Other features and advantages of the invention will become apparent from the following description and drawings.

In the accompanying drawings forming a part of this application and in which like numerals are employed to designate like parts throughout the same:

Figure 1 is a perspective view of the machine showing it attached to a railway car on the right-hand side only.

Figure 2 is a top plan view thereof, with the hoisting device removed.

Figure 3 is a detail sectional view taken on the plane of the line 3—3 of Figure 2.

Figure 4 is likewise a section taken on the line 4—4 of the same figure, looking in the direction of the arrows.

Figures 5 and 6 are detail views of a part to be hereinafter known as a connector.

Referring now to the drawings in detail, it will be seen that we have shown a conventional type of track car C which includes, among other details, a pair of longitudinal side bars B. This constitutes no part of the invention, but it is to this type of car that we prefer to attach our invention. It is to be understood however, that it can well be associated with various other forms of rolling stock.

Briefly described, the improved invention comprises a frame which is adapted to be pivotally mounted on the so-called track car, there being a hoisting device also mounted on the latter for the purpose of raising and lowering the frame and holding it in a set position. Among other details, the frame carries the aforesaid weeding hoe and this is set at an angle to the line of travel so that it will act as a cam when it encounters the ends of the rail-ties. Hence, it will never hang but will pass on from tie to tie without hinderance. As before stated, the hoe moves in two directions; that is horizontally, and vertically, being held in constant yielding engagement with the ties and ground by novel spring means. Cooperating with the hoe is a surface evener and drag which serves to carry the sand and dirt up the grade toward the tie-ends to reinforce the mud shoulder where it is necessary and to produce the desired symmetrical appearance.

The frame is designated as a whole by the reference character 1 and instead of being composed of pipes, as in the patent, it is made up of a number of angle irons or bars, for instance two divergent side bars 2 and a pair of cross-bars 3. The side bars have their inner ends bent as shown and adjustably connected to a pair of comparatively short arms 4, which are in turn pivotally and adjustably connected with vertical anchoring plates 5 mounted on the longitudinal bars of the car. Suitable fastenings are, of course, used to secure the parts together, and as before intimated, this arrangement permits the frame to have vertical swinging movement and allows it to be bodily adjusted to permit change in the elevation.

The hoisting device comprises a standard 6 which is adjustably connected at its lower end with a socket carrying bracket 7. A suitably designed body 8 is secured in any appropriate fashion to the upper end of the standard and this body carries a rotary drum 9 on which one end of a cable or other flexible element 10 is wound, the other end thereof being attached to the frame. The shaft of the drum is equipped with a worm-wheel 11 with which the worm or screw 12 meshes. As the worm is secured to a crank shaft, it is obvious that when the hand crank is turned, the frame is raised or lowered according to the direction of rotation. This form of hoisting device is positive in action and will absolutely not slip.

Considering now the weeding hoe, it will be seen that it is generally denoted by the numeral 13, and it is composed of a blade and vertical shank. The blade is angled as before stated and the shank is slidably mounted in a bearing 14 secured to the swinging arm 15. In order to provide for the desired double action of the arm, we attach a special bracket 16 to the underside of the front cross-piece 3, this bracket having a vertically bored portion projecting beyond said cross-piece. A member, which we will conveniently call a connector 17, is pivoted to this projecting portion. The connector is substantially channel-shaped in cross-section and the flanges thereof receive the projecting portion of the bracket 16 between them as better seen in Figs. 2 and 4. The arm 15 is an angle bar and the vertical flange thereof lies in contact with the web of the connector, being pivoted on a horizontal axis thereto as seen at 18. The connector is equipped with a laterally extending lug or ear 19 which underlies the horizontal flange of the arm and a bolt 20 extends through this flange and ear, a coiled spring 21 surrounding the bolt between the head and said flange. It is with this arrangement that the so-called double fulcrum is produced. The arm 15 is apertured and one end of a long coiled spring 22 is selectively anchored in one of the apertures, the other end thereof being secured in one of the apertures in the strip 23 which extends diagonally between the cross-piece 3 and the adjacent bar 2. This construction makes for proper adjustment of the tension of the spring and serves to exert a direct pull on the arm 15. In order to limit the forward swing of the arm, the adjacent end of the strip 23 is upturned to form a stop.

Secured to the projecting ends of the cross-piece 3 and extending along the side of the rear bar 2, is a supplemental angle bar 24 which serves to decidedly reinforce the structure and permits proper positioning of the longitudinal bars 25 and 26. The first named bar has adjustable connection with the bars 24 and 2 and has its rear end downturned as indicated at 27, the extremity of this part being attached to the inner end of the oblique blade 28. As shown, this blade is inclined and merges at its outer end into a plow point 29 which is secured to the downturned end of the bar 26. Disposed in spaced relation back of the blade is the evener or scraper 30, the inner end of which is connected by a chain 31 to the bar 25.

It has been already intimated that the machine includes a colter and by directing attention to Figure 3, it will be seen that the same comprises a cutting disk 32 which is secured to the outer end of a horizontal shaft 33. The inner end of the shaft carries an enlarged ball-like portion 34 which is journalled between the parts of a split bearing 35. Thus, a universal joint is had. The bearing is adjustably supported from an arcuate member 36 extending across the apex portion of the frame. Hence, the joint and bearing can be adjusted at will. An inverted U-shaped member or yoke 37 is connected with the outer end of the shaft and a vertical screw 38 is in turn swivelly connected at its lower end to the bight portion thereof and has threaded connection with a bracket 39 on the bar 26. With this arrangement, the colter can be properly adjusted.

In practice, the car travels in the direction of the arrow A and the plow, blade and evener serve to eradicate the weeds and smooth the loose dirt. At the same time, the weeding hoe serves to remove the weeds which grow close to and in between the ties.

The hereinbefore described machine is to be built in both right and left hand style, one to be used on each side of the car at the same time so that both sides of the track will be operated upon simultaneously. For the sake of clearness, the machine has been shown applied to but a single side of the car. Hence, the description appears in the singular.

Although we have specifically described the invention and have shown the preferred embodiment, it is to be understood that minor changes such as do not depart from the scope of the annexed claims, may be resorted to if desired.

We claim:

1. In a weed cutter and track dresser, a supporting frame adapted to be mounted on a traveling support, a weeding hoe set at an oblique angle to the line of travel of said frame, said hoe having a vertical shank which is pivotally supported from said frame on a vertical pivot, said pivot being at a point remote from the shank, whereby to permit said hoe and shank to reciprocate bodily in a substantially longitudinal direction with respect to the frame.

2. In a weed cutter and track dresser, a supporting frame adapted to be mounted on a traveling support, a weeding hoe set at an oblique angle to the line of travel of said frame, said hoe having a vertical shank which is pivotally supported from said frame on vertical and horizontal axes to permit bodily longitudinal reciprocation and vertical movement of the hoe and shank at the same time.

3. In a weed cutter and track dresser, a supporting frame, a weeding hoe having a shank, a double fulcrum connecting said shank with the frame, yieldable means for holding the hoe to its work in a longitudinal direction, and separate yielding means for maintaining the hoe in yieldable engagement with the ground.

4. In a weed cutter and track dresser, a supporting frame, a weeding hoe having a shank, a stationary bracket on said frame, an arm to which said shank is connected, and a connector disposed between the outer end of said arm and said bracket, said connector having vertical pivotal connection with the latter to permit horizontal swinging of the arm, and also having separate horizontal pivotal connection with the arm to permit simultaneous vertical movement thereof.

5. In a weed cutter and track dresser, an arm, a weeding hoe carried thereby, a support, and a connector between the support and adjacent end of the arm, said connector being substantially channel-shaped in cross-section and being equipped with a lateral ear on which said arm bears, a bolt passing through said ear and arm, a coiled spring surrounding the bolt between its head and said arm, and a second pivotal connection between the arm and the web portion of the connector.

6. In a weed cutter and track dresser, a frame, an angled weeding hoe having a shank, an arm pivotally connected to said frame, the shank of the hoe being secured to said arm, and spring means connected at one end to the arm adjacent the hoe and connected at its opposite end to the frame at a point to cause the spring to exert a pull in the direction of travel of the machine.

7. In a weed cutter and track dresser, a traveling supporting frame, a weeding hoe having a shank vertically disposed, a horizontal arm to which said shank is connected, a bracket mounted on the frame, a connector disposed between the arm and bracket, said connector being pivoted to the bracket on a vertical pivot and said arm being in turn pivoted on the connector on a horizontal pivot, spring means in association with the last named pivot to maintain the hoe in yieldable engagement with the ground, and separate and adjustable spring means in association with the frame and arm to exert a pull in the direction of travel of the machine.

8. In a weed cutter and track dresser, a supporting frame, a colter including a cutting disk and shaft, to one end of which the disk is attached, a universal joint between the inner end of the shaft and said frame, and a swivel connection between the other end of the shaft and the frame.

9. In a weed cutter and track dresser, a supporting frame, a colter, a split bearing, an arcuate guide on the frame with which said bearing is connected for longitudinal adjustment, a ball-joint on the inner end of the colter-shaft journalled in said bearing, an inverted yoke connected to the outer end of the shaft, a vertical screw having swivel connection with the yoke and having threaded connection with said frame.

10. In a weed cutter and track dresser, a supporting frame adapted to be mounted on a traveling carrier in a manner to permit vertical swinging and bodily adjustment, a hoisting device in association with the carrier and said frame, a weeding hoe set on an oblique angle to the line of travel, a double fulcrum between the hoe mounting means and frame to permit movement of the hoe in both horizontal and vertical directions, yieldable means for holding the hoe in a position to engage the tie-ends at all times, separate yieldable means for maintaining the hoe in yielding contact with the ground, and a vertically adjustable colter having universal connection with said frame.

In testimony whereof we hereunto affix our signatures.

Mrs. ELIZABETH GANNON.
BERNARD D. McGINN.
AUGUST H. SPRUTE.
GERRIT F. AKIN.
THOMAS. J. FEELY.